United States Patent
Andreescu

(10) Patent No.: US 6,513,244 B1
(45) Date of Patent: Feb. 4, 2003

(54) METHOD FOR PREPARING COAXIAL CABLES WITH AN EXTERNAL RINGED CONDUCTOR, AND TOOL THEREFOR

(75) Inventor: Paul Andreescu, Brussels (BE)

(73) Assignee: SEE SPRL, Braine l'Alleud (BE)

( * ) Notice: Subject to any disclaimer, the term of this patent is extended or adjusted under 35 U.S.C. 154(b) by 0 days.

(21) Appl. No.: 09/674,439

(22) PCT Filed: Feb. 25, 2000

(86) PCT No.: PCT/EP00/01548

§ 371 (c)(1),
(2), (4) Date: Nov. 1, 2000

(87) PCT Pub. No.: WO00/52801

PCT Pub. Date: Sep. 8, 2000

(51) Int. Cl.[7] ................................. H02G 1/12
(52) U.S. Cl. ....................... 30/90.2; 30/90.1
(58) Field of Search ................ 30/90.1, 90.2, 30/90.3, 90.6

(56) References Cited

U.S. PATENT DOCUMENTS 4,729,268 A * 3/1988 Morrow .................... 30/90.1 X
5,511,305 A * 4/1996 Garner ....................... 30/90.4

FOREIGN PATENT DOCUMENTS

JP          10112914         * 4/1998

* cited by examiner

Primary Examiner—Douglas D. Watts
(74) Attorney, Agent, or Firm—Maria Parrish Tungol

(57) ABSTRACT

The invention relates to a method for preparing coaxial cables by cutting the outer conductor, the dielectric and the central conductor to length, the cable being first cut perpendicularly to its axis, and then treated by means of a tool with a blade (3) allowing to shear the sheath off, while a guide (7) comes to rest on the central conductor and, under the action of a positioning and abutment device (8), (9), (10), one or more supplementary blades (5), i.e. (14), (15) respectively, cut the outer conductor, the dielectric and the inner conductor, and possibly the outer conductor is treated by means of a flaring tool.

The invention also relates to a special tool for this coaxial cable preparing method, which comprises a blade (3) allowing to shear the sheath off;

a guide (7) which may rest on the central conductor;
  a positioning and abutment tool (8), (9), (10);
  one or more supplementary blades (5), i.e. (14), (15) respectively, allowing to cut the outer conductor, the dielectric and the inner conductor.

14 Claims, 6 Drawing Sheets

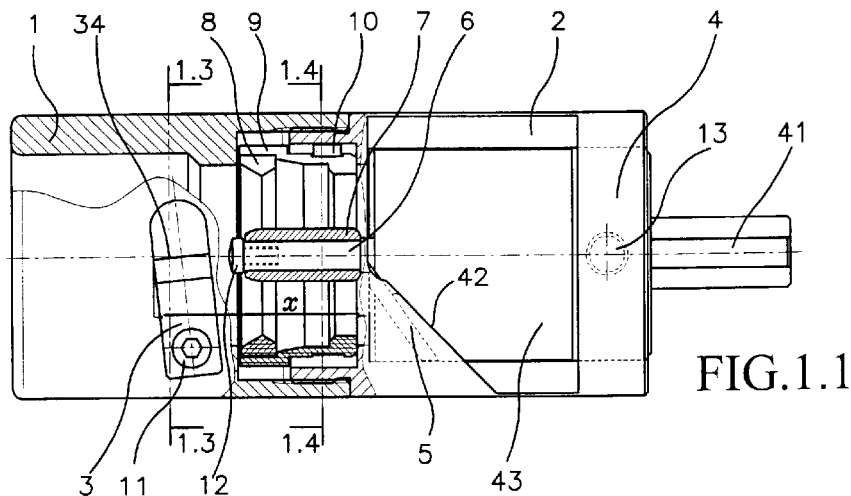
FIG.1.1
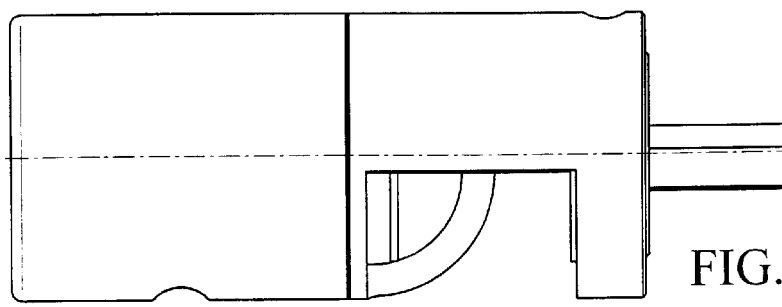
FIG.1.2
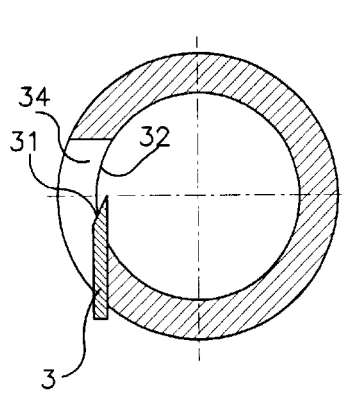
FIG.1.3
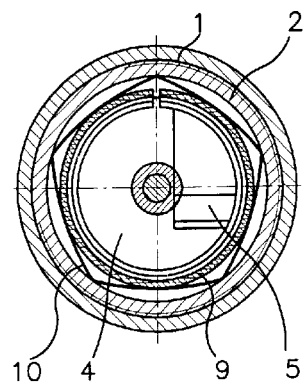
FIG.1.4
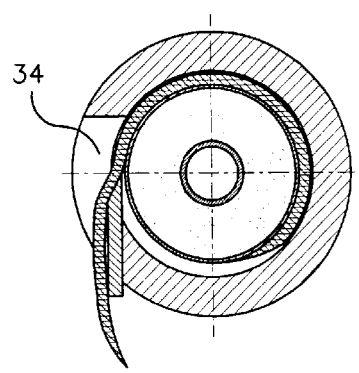
FIG.2

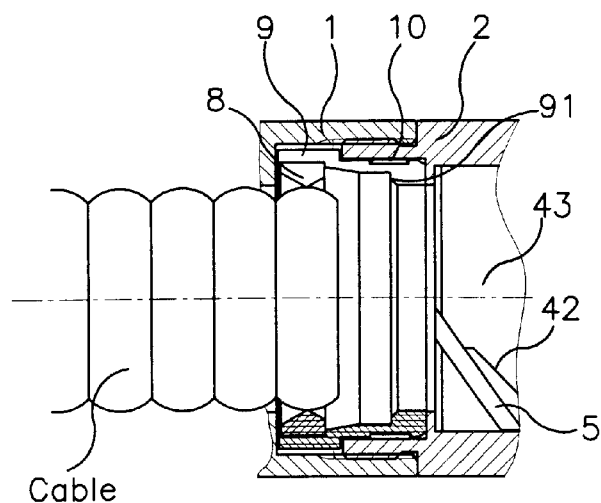
FIG.3.1
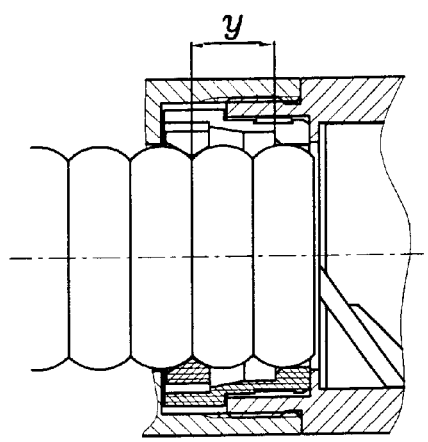
FIG.3.4
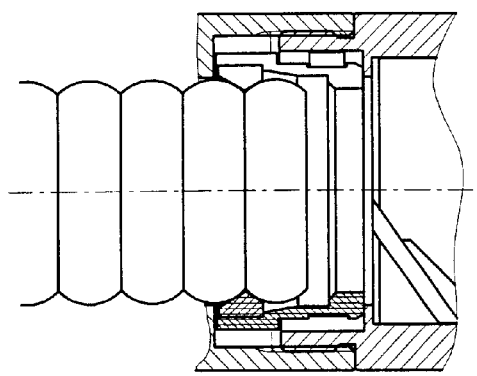
FIG.3.2
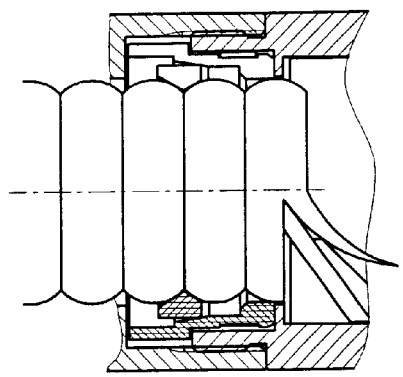
FIG.3.5
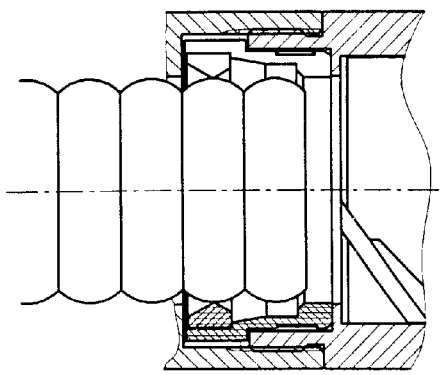
FIG.3.3
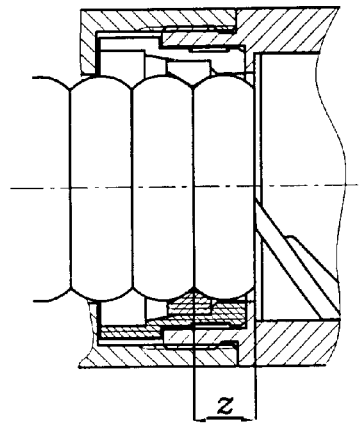
FIG.3.6

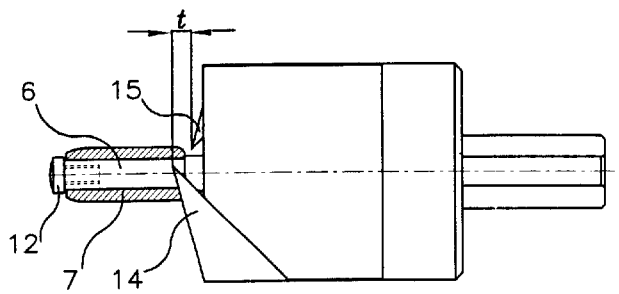
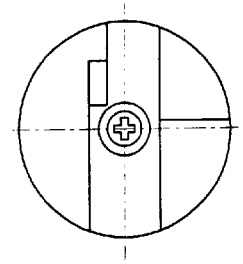
FIG.4     FIG.4b
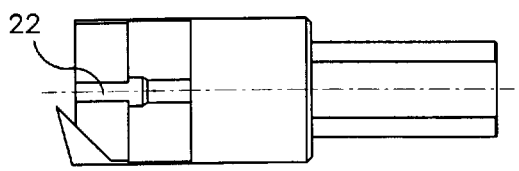
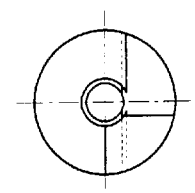
FIG.5     FIG.5b
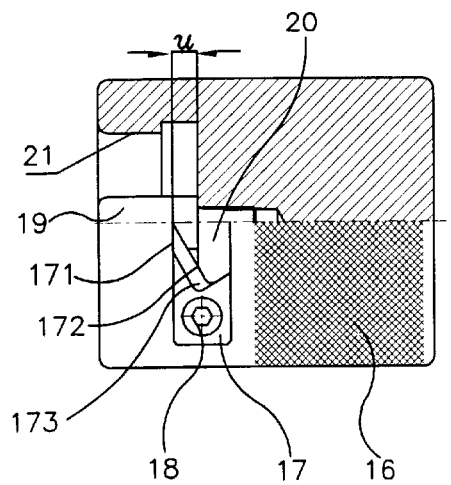
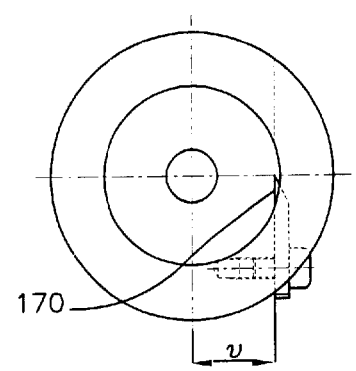
FIG.6.1a     FIG.6.1b
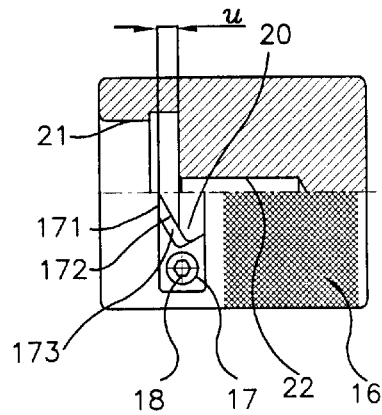
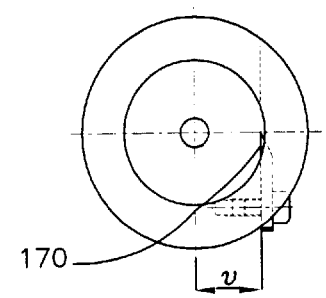
FIG.6.2a     FIG.6.2b

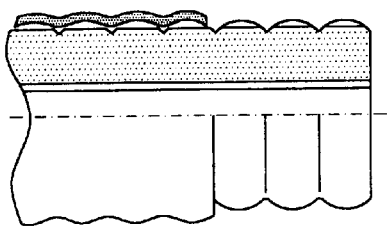
FIG.7.1
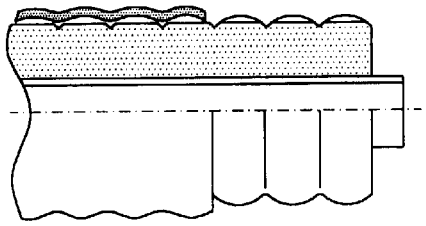
FIG.7.2
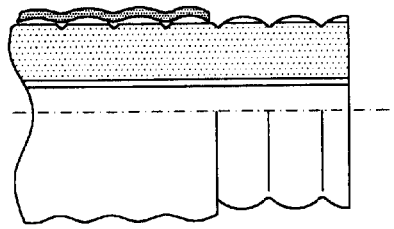
FIG.7.3
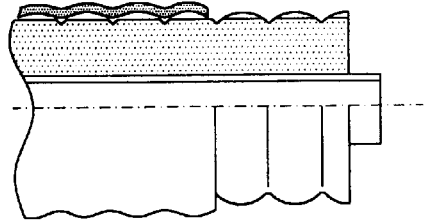
FIG.7.4
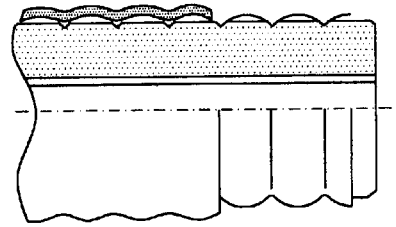
FIG.7.5
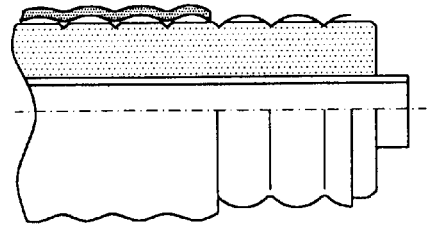
FIG.7.6
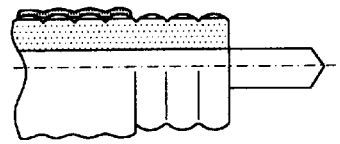
FIG.7.7
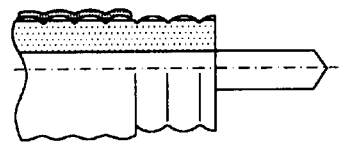
FIG.7.8
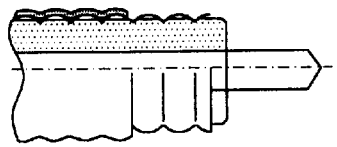
FIG.7.9

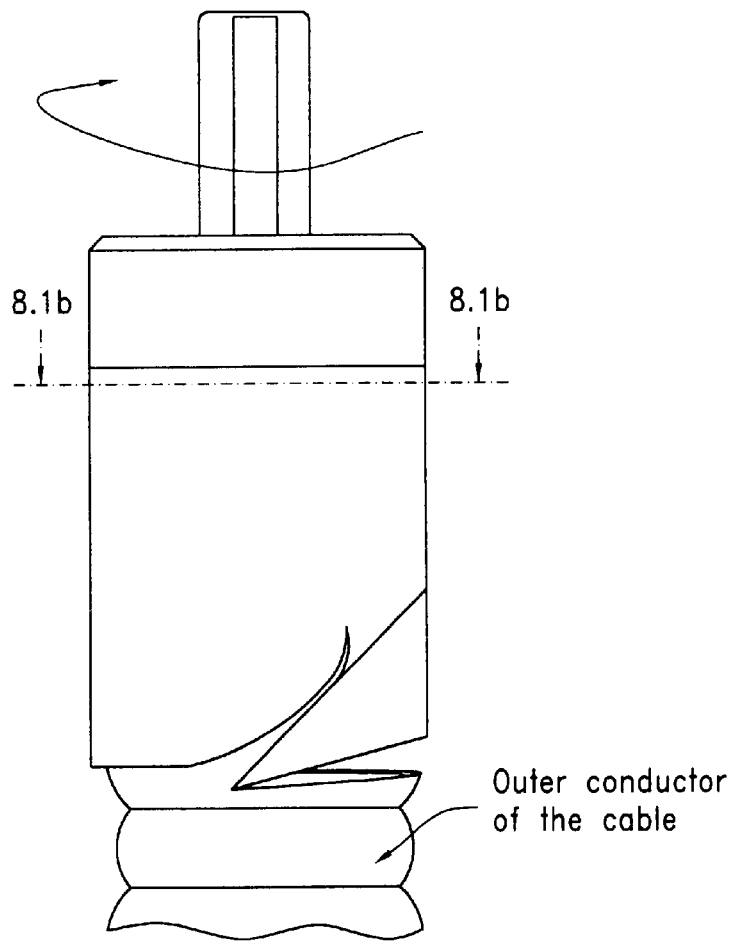
FIG.8.1a
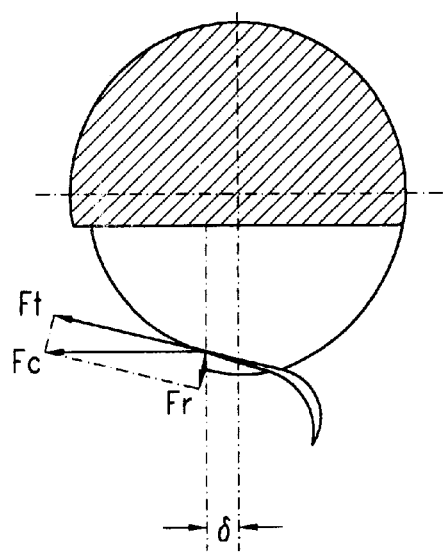
FIG.8.1b

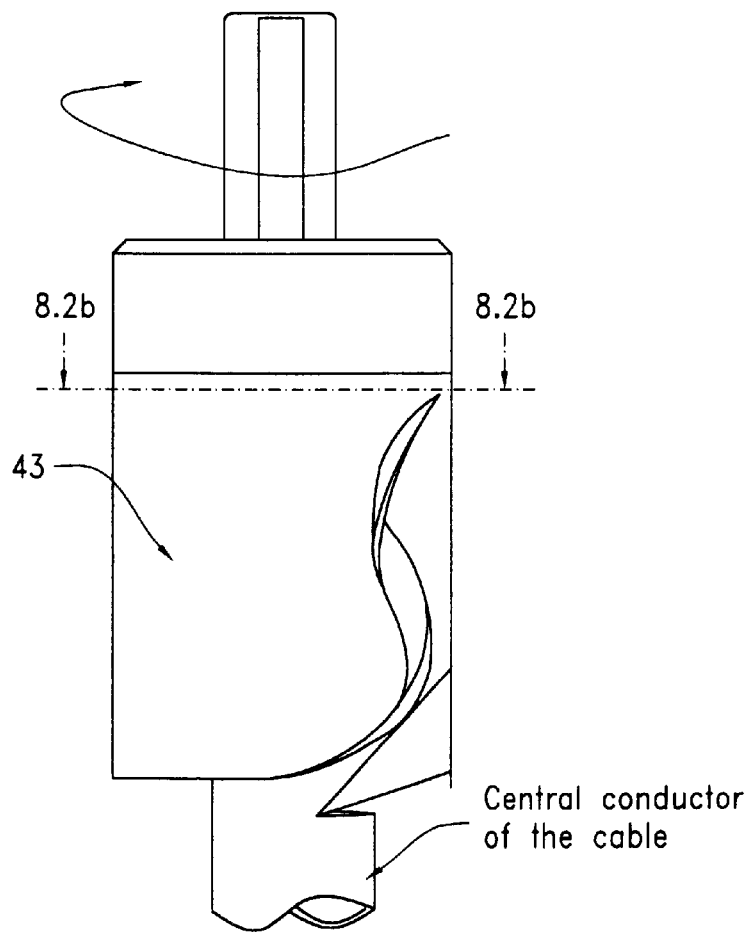
FIG.8.2a
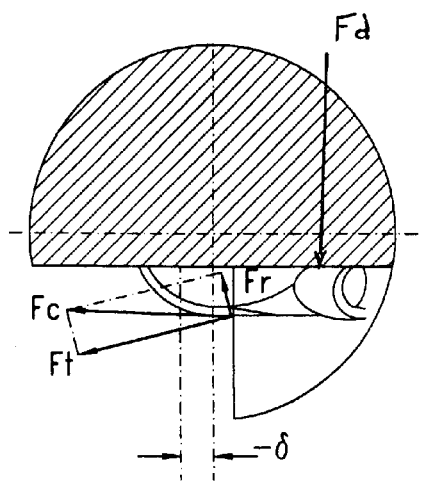
FIG.8.2b

METHOD FOR PREPARING COAXIAL CABLES WITH AN EXTERNAL RINGED CONDUCTOR, AND TOOL THEREFOR

BACKGROUND OF THE INVENTION

A tool for preparing coaxial cables with a ringlike outer conductor, can only ensure a fast, reproducible and high quality assembly of connectors, if it meets a number of requirements:

Cutting the central conductor, the dielectric, the outer conductor and the sheath of the cable, in accordance with the requirements of the connector to be fitted thereon.

Cutting cable conductors with no burrs or filings. A thin burr, or filings, inside the outer conductor may generate intermodulations (generally known as PIM, the acronym of Passive Intermodulations).

Automatically ensuring preparation accuracy in relation to a reference (a crest or a groove of the outer conductor), regardless of the accuracy wherewith the cable is sawed.

The invention particularly pertains to a tool meeting all the aforesaid requirements. The invention also provides a method for preparing coaxial cables with a ringlike outer conductor, as well as a tool specifically designed for that purpose.

BRIEF SUMMARY OF THE INVENTION

The invention thus provides a method for preparing coaxial cables which have a sheath, a ringlike outer conductor, a central conductor and a dielectric separating the outer conductor from the central conductor, by cutting the outer conductor, the dielectric and the central conductor to length, characterized in that the cable is cut perpendicularly to its axis, in a position approximately determined in relation to a groove of the outer conductor; in that, with the help of a tool with a blade, the sheath is sheared off by rotation in a helical motion, while a guide of the tool comes to rest on the central conductor and, under the action of a positioning and abutment device of the tool, one or more supplementary blades of the tool, cut the outer conductor, the dielectric and the inner conductor, the inner conductor and the dielectric on the one hand, and the outer conductor on the other hand, respectively, and possibly the outer conductor is treated by means of a flaring tool.

The invention thus also provides a tool for preparing coaxial cables which have a sheath, a ringlike outer conductor, a central conductor and a dielectric separating the outer conductor from the central conductor, characterized in that it comprises a blade for shearing the sheath off;

a guide which may rest on the central conductor;

a positioning and abutment tool;

one or more supplementary blades of the tool, for cutting the outer conductor, the dielectric and the inner conductor, the inner conductor and the dielectric on the one hand, and the outer conductor on the other hand, respectively.

According to the invention the tool may preferably be designed to be provided with a flaring tool for treating the outer conductor.

According to further preferred features of the invention, the tool may in particular be composed of a cable sheath peeling knife, which holds the blade fastened by a screw, said peeling knife being screwed on a guide of a blade holder and said blade holder being fastened by a screw and holding a supplementary blade and an axle about which the inner guide may rotate, secured by a screw;

the split rings may in particular be housed between two guides and may rotate freely relative to each other and to a spring and open apart while being held in a coaxial position with respect to their housing by a split zigzag or polygonal flat spring;

said that flat spring has a pentagonal shape;

blade may in particular be fastened to form an angle of about 6 degree with respect to a plane perpendicular to the axis of the tool, which allows it to move in a helical path, as the tool rotates and advances;

said blade holder may in particular comprise two blades, in order to allow the cutting of the central conductor of the cable, in a way shifted from the cutting plane of the dielectric and of the outer conductor;

a blade holder with three blades may in particular be used;

a flaring tool may in particular be used, composed of a body, an inner guide and a blade fastened by a screw in an aperture, said blade having a dimension (v) which is greater than the greatest radius of the dielectric and smaller than the greatest inside radius of the outer conductor;

a blade may in particular be used which is made of one piece with the blade holder and in that the cutting edge of the blade is shifted through a distance (*) from the radius.

According to further preferred features of the invention, the method may in particular involve that, with the help of a handle or of a drilling machine, secured at the end of the blade holder, the tool is turned, while it is slightly pushed towards the cable.

the method may in particular involve that, while the tool rotates, a guide a rolling movement on the inner surface of the central conductor of the cable, avoiding the formation of filings and reducing the effort to drive the tool.

BRIEF DESCRIPTION OF THE DRAWINGS

The invention is illustrated by the attached drawings in which:

FIG. 1 represents a side view, a top view, a section view in direction AA and a section view in direction BB of a tool according to the invention;

FIG. 2 represents a section, in use, of a peeling knife according to the invention;

FIG. 3 represents schematically, through several side sections, the working of the method and tool according to the invention;

FIG. 4 represents a side and end view of one embodiment of a blade holder according to the invention;

FIG. 5 represents a side and end view of another embodiment of a blade holder according to the invention;

FIG. 6 represents side and end views of two embodiments of a flaring tool according to the invention;

FIG. 7 represents several embodiments of cable ends prepared in accordance with the invention;

FIG. 8 schematically represents the principle of the blade holder operation in accordance with the invention.

DETAILED DESCRIPTION OF THE INVENTION

FIG. 1 shows a tool for such kind of cables having a hollow central conductor. The tool is composed of a cable sheath peeling knife (1), which holds the blade (3) fastened by the screw (11). In this case, the peeling knife (1) is screwed on the guide (2) of the blade holder (4). The blade holder (4) is fastened by the screw (13) and holds the blade (5) and the axle (6) about which the inner guide (7) may rotate, secured by the screw (12). Depending on different sizes and requirements, the blade holder and the blade may be made from one piece.

The split rings (8) and (9) are housed between the guide (1) and the guide (2) and may rotate freely relative to each other and to the spring (10) and open apart while being held in a coaxial position with respect to their housing by a zigzag or polygonal flat spring. In the illustrated case, the flat spring (10) has a pentagonal shape.

In order to use the tool, the cable has to be sawed perpendicularly to its axis and approximately in a groove of the outer conductor.

First, the tool is disposed with the guide of the peeling knife (1) at the end of the cable. With the help of a handle or of a drilling machine, secured at the end (41) of the blade holder (1), the tool has to be turned clockwise, while it is slightly pushed towards the cable. The blade (3) is fastened to form an angle of about 6° with respect to a plane perpendicular to the axis of the tool, which allows it to move in a helical path, as the tool rotates and advances. The blade (3) penetrates the cable sheath and lifts it in the plane (31). Then the sheath is sheared off between the cutting edges formed by the surfaces (31) and (32) in the passage plane between the guide (1) and the blade (3). The sheath chip comes out of the tool through the aperture (34), as shown in FIG. 2. As the tool progresses, the inner guide (7) penetrates the central conductor of the cable and retains it. While the tool rotates, the guide (7) performs a rolling movement on the inner surface of the central conductor of the cable, which allows to avoid the formation of small filings and reduces the effort required to drive the tool. The preparation sequence is shown in FIGS. 3.1 to 3.6. The outer conductor of the cable, now bare, penetrates below the ring (8), opens it apart, and the latter opens apart the ring (9). The elasticity of the rings (8) and (9), in combination with the action of the spring (10) forces them to follow the outline of the outer conductor the cable. When the blade (5) contacts the front plane of the cable, it cuts the two conductors and the dielectric. The chips are cleared by the blade (5) and the surfaces (42) and (43) of the blade holder (4) and, when the tool stops, a clean filingless surface is obtained, as shown in FIGS. 3.5 and 3.6. FIG. 3.4 shows that the ring (9) is opened apart by a crest, while the ring (8) remains closed up in a groove of the outer conductor. Then, the ring (8), dragged by the cable slides below the ring (9), as shown in FIG. 3.5. When the ring (8) abuts against the shoulder (91) inside the ring (9), the tool automatically stops on the cable. Once the tool is removed after said preparation, the ring (8) moves back below the ring (9) up to its starting position and opens apart with the ring (9), thereby releasing the cable. The set of parts (8), (9) and (10) moves back to its starting position and the tool is ready for a new preparation.

Cable preparation, which is manufacturer-dependent, may be effected with selected sizes and configurations of the tool.

FIGS. 7.1 through 7.6 show preparation variants for cables having a hollow central conductor.

The sheath displacement length (bare outer conductor) is determined by the dimension (x) of the tool, as shown in FIG. 1.

The length through which the outer conductor, the dielectric and the central conductor will be cut (displacement length to obtain a clean cut) is determined by the dimension (y) of the tool, as shown in FIG. 3.4.

The conductors and the dielectric are cut in the same plane, at a groove, as shown in FIG. 7.1 or at a crest, as shown in FIG. 7.3, as determined by the dimension (z) of the tool, as shown in FIG. 3.6.

By replacing the blade holder (4) and the blade (5) with the ones shown in FIG. 4, having two blades (14) and (15), the central conductor of the cable may be cut to be shifted from the cutting plane of the dielectric and of the outer conductor, as shown in FIGS. 7.2 and 7.4. Said shift is determined by the dimension (t) of the tool, as shown in FIG. 4.

In order to obtain the preparations shown in FIGS. 7.5 and 7.6 a blade holder with three blades may be used. If the dielectric is not to be touched, since the outside diameter thereof is greater below a crest of the outer conductor than the outside diameter of the outer conductor in a groove, a tool complement has to be used—a flaring tool as shown in FIG. 6.1.

The flaring tool is composed of the body (16), the inner guide (19) and the blade (17) fastened by the screw (18) in the aperture (20). The dimension (v) is greater than the greatest radius of the dielectric and smaller than the greatest inside radius of the outer conductor.

The flaring tool is disposed on the cable prepared according to FIGS. 7.1 and 7.2, and slightly pushed while being rotated clockwise. The inner guide (19) is engaged in the central conductor and the tip (170) of the blade (17) penetrates the outer conductor. The cutting edge (171) cuts the outer conductor while flaring it, whereas the cutting edge (172) breaks the front portion of the conductor which passes on the inclined plane (173) and is cleared through the aperture (20). Since this cut is executed from the inside outwards, no flaring tool is required after said cut and the inner surface of the outer conductor, which comes into contact with the connector body is clean, with no filings or burrs. The length through which the outer conductor is displaced by the flaring tool (bare dielectric) is determined by the dimension (u), as shown in FIG. 6.1.

When using a blade holder like the one shown in FIG. 5, having one or more blades according to the above principle and an axial hole (22), cables with a solid central conductor may be prepared. These preparations are shown in FIGS. 7.7 and 7.8. In order to obtain the preparation shown in FIG. 7.9, the flaring tool as shown in FIG. 6.2 has to be used as described above, on the cable prepared according to FIG. 7.7. This time the flaring tool is guided by the bore (21) on the outer conductor and by the bore (22) on the central conductor of the cable.

The drawbacks of the existing tools consist in positioning with respect to the profile of the outer conductor of the cable and cutting the conductors, which generates burrs. They use either cutter blades which cut from the outside inwards or blades with a radial cutting edge. Due to wear of the cutting portion of the tool, burrs become more and more important.

In the first case, the tool clamps the outer conductor and forms burrs on the inner part of the two conductors. In order to flare the outer conductor, a conical part is used which follows a motion of revolution and is pushed between the outer conductor and the dielectric. This part draws the outer conductor apart, but the tip of the cone scratches it and produces filings, hits the dielectric and at the same time removes the burr by wedging it between the dielectric and the outer conductor on the surface for contact with the connector body. In order to deburr the hollow central conductor, a conical cutting tool has to be used which produces filings to be accommodated within the dielectric.

In the second case, positioning of the preparation with respect to the profile of the outer conductor, depends on the accuracy wherewith the cable has been sawed and the burrs produced by the cut are formed inside and outside each conductor, generating the same problems.

In the tool which forms the subject of the present invention, blades are used which have the cutting edge parallel to a radius and a particular chip clearing system, which provides that burrs generated when the outer conductor is cut are formed on the side opposite to the contact surface, which makes deburring unnecessary.

This system allows burr removal for the hollow central conductor.

FIG. 8.1 shows a blade which is made of one piece with the blade holder. The cutting edge of the blade is shifted through ($\delta$) from the radius. The operation thereof will be understood with reference to a simplified model of resolution of the force exerted by the cutting edge of the blade in a plane perpendicular to the axis. By rotating the tool clockwise, the force Fc acting on the wall of the tube which forms the outer conductor of the cable is resolved into Ft, which follows a tangential direction cutting the tube and Fr, which follows the direction of the radius pushing the chip from the inside outwards. The burr generated by the cut is only formed on the outer edge of the tube and is not produced in the inside contact area.

The burrless cut for the hollow central conductor is shown in FIG. 8.2. The same simplified model is used for the resolution of the force exerted by the cutting edge of the blade. This time, the cutting edge is shifted through ($-\delta$) from the radius. The force Fc is resolved into Ft, which cuts the tube and into Fr which pushes the chip from outside inward. As the chip is generated, it rolls up and rests on the clearing surface (43) of the blade. The force Fd exerted by the surface (43) pushes the chip outwards, and the latter, due to its being more rigid than the outer conductor, flares the cut portion of the tube. Thanks to the force exerted by the cutting edge, which has a component directed from the outside inwards, and to the flaring force exerted by the clearing surface in the cutting area, the tube is cut in a substantially burrless manner. The result is that, by properly selecting the shift between the cutting edge of the blade and the radius, it is possible to choose on which side of the wall of the tube burrs will be generated or, in some cases, to remove them.

The invention provides the above advantages:

Highly accurate reproducible preparation, which is independent of the cable sawing accuracy.

Automatic positioning of the preparation with respect to the profile of the outer conductor of the cable.

Positioning independent of the variation of the profile of the outer conductor, depending on the cable manufacturer.

Burrless cut.

When burrs may only be removed on one side of the wall of the conductor, the tool allows to choose the contact side as a burrless side.

Possibility to use the same principle for several different preparations.

What is claimed is:

1. A method for preparing coaxial cables which have a sheath, a ringlike outer conductor, a central conductor and a dielectric separating the outer conductor from the central conductor, by cutting the outer conductor, the dielectric and the central conductor to length, characterized in that the cable is cut perpendicularly to its axis, in a position approximately determined in relation to a groove of the outer conductor; in that, with the help of a tool with a blade (3), the sheath is sheared off by rotation in a helical motion, while a guide (7) of the tool comes to rest on the central conductor and, under the action of a positioning and abutment device (8), (9), (10) of the tool, one or more supplementary blades (5), i.e. (14), (15) respectively of the tool, cut the outer conductor, the dielectric and the inner conductor, the inner conductor and the dielectric on the one hand and the outer conductor on the other hand, respectively, and possibly the outer conductor is treated by means of a flaring tool.

2. A tool for preparing coaxial cables which have a sheath, a ringlike outer conductor, a central conductor and a dielectric separating the outer conductor from the central conductor, characterized in that it comprises a blade (3) for shearing the sheath off;

a guide (7) which may rest on the central conductor;

a positioning and abutment tool (8), (9), (10);

one or more supplementary blades (5), i.e. (14), (15) of the tool, for cutting the outer conductor, the dielectric and the inner conductor, the inner conductor and the dielectric on the one hand, and the outer conductor on the other hand, respectively.

3. A tool for preparing coaxial cables as claimed in claim 2, characterized in that it is (designed to be) provided with a flaring tool for treating the outer conductor.

4. A tool for preparing coaxial cables as claimed in claim 2, characterized in that the tool is composed of a cable sheath peeling knife (1), which holds the blade (3) fastened by a screw (11), said peeling knife (1) being screwed on a guide (2) of a blade holder (4), and said blade holder (4) being fastened by a screw (13) and holding a supplementary blade (5) and an axle (6) about which the inner guide (7) may rotate, secured by a screw (12).

5. A tool for preparing coaxial cables as claimed in claim 4, characterized in that blade holder (4) and supplementary blade (6) are made from one piece.

6. A tool for preparing coaxial cables as claimed in claim 4, characterized in that split rings (8) and (9) are housed between guide (1) and guide (2) and may rotate freely relative to each other and to a spring (10) and open apart while being held in a coaxial position with respect to their housing by a zigzag or polygonal flat spring.

7. A tool for preparing coaxial cables as claimed in claim 6, characterized in that flat spring (10) has a pentagonal shape.

8. A tool for preparing coaxial cables as claimed in claim 2, characterized in that blade (3) is fastened to form an angle of about 6° with respect to a plane perpendicular to the axis of the tool, which allows it to move in a helical path, as the tool rotates and advances.

9. A tool for preparing coaxial cables as claimed in claim 4, characterized in that blade holder (4) comprises two blades (14) and (15), in order to allow the cutting of the central conductor of the cable, in a way shifted from the cutting plane of the dielectric and of the outer conductor.

10. A tool for preparing coaxial cables as claimed in claim 4, characterized in that a blade holder with three blades may be used.

11. A tool for preparing coaxial cables as claimed in claim 4, characterized in that a flaring tool is used composed of a body (16), an inner guide (19) and a blade (17) fastened by a screw (18) in an aperture (20), said blade having a dimension (v) which is greater than the greatest radius of the dielectric and smaller than the greatest inside radius of the outer conductor.

12. A tool for preparing coaxial cables as claimed in claim 4, characterized in that a blade is used which is made of one piece with the blade holder and in that the cutting edge of the blade is shifted through a distance ($\delta$) from the radius.

13. A method for preparing coaxial cables, according to claim 1, characterised in that, with the help of a handle or of a drilling machine, secured at the end (41) of the blade holder (1), the tool is turned, while it is slightly pushed towards the cable.

14. A method for preparing coaxial cables, according to claim 1, characterised in that, while the tool rotates, a guide (7) performs a rolling movement on the inner surface of the central conductor of the cable, avoiding the formation of filings and reducing the effort to drive the tool.

\* \* \* \* \*